(12) United States Patent
Lee et al.

(10) Patent No.: US 11,824,702 B2
(45) Date of Patent: Nov. 21, 2023

(54) RECEIVER FOR REMOVING INTERSYMBOL INTERFERENCE

(71) Applicants: SK hynix Inc., Icheon (KR); Seoul National University R&DB Foundation, Seoul (KR)

(72) Inventors: Kwangho Lee, Seoul (KR); Jinhyung Lee, Icheon (KR); Deog-Kyoon Jeong, Seoul (KR)

(73) Assignees: SK hynix Inc., Icheon (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 17/720,194

(22) Filed: Apr. 13, 2022

(65) Prior Publication Data
US 2023/0208696 A1 Jun. 29, 2023

(30) Foreign Application Priority Data
Dec. 28, 2021 (KR) .......................... 10-2021-0189853

(51) Int. Cl.
*H04L 27/26* (2006.01)
*H04B 1/16* (2006.01)
*H04L 7/033* (2006.01)

(52) U.S. Cl.
CPC ........... *H04L 27/2675* (2013.01); *H04B 1/16* (2013.01); *H04L 7/0337* (2013.01); *H04L 27/2657* (2013.01)

(58) Field of Classification Search
CPC ............. H04L 27/2675; H04L 27/2657; H04L 7/0037; H04B 1/16

USPC ......................................................... 375/262
See application file for complete search history.

(56) References Cited

U.S. PATENT DOCUMENTS

| 8,548,108 | B2 | 10/2013 | Hidaka |
| 9,596,108 | B2 | 3/2017 | Iyer et al. |
| 2011/0267015 | A1* | 11/2011 | Lu .................. H02M 3/1588 323/235 |

OTHER PUBLICATIONS

Jinhyung Lee, "Design of High-Speed Receiver for Video Interface with Adaptive Equalization", Doctoral Thesis, Seoul National University, 2019.
S. Hwang et al., "A 1.62-5.4-Gb/s Receiver for DisplayPort Version 1.2a With Adaptive Equalization and Referenceless Frequency Acquisition Techniques," IEEE TCAS I, vol. 64, No. 10, pp. 2691-2702, Oct. 2017.
W. Jung et al., "A 8.4Gb/s Low Power Transmitter with 1.66 pJ/b using 40:1 Serializer for DisplayPort Interface," ISOCC, 2020, pp. 41-42.

(Continued)

*Primary Examiner* — Leila Malek

(57) ABSTRACT

A receiver includes a sampling circuit configured to sample a comparison result between an input signal and a plurality of threshold voltages according to a sampling clock signal; a clock controller configured to generate the sampling clock signal according to a clock control signal; and a control circuit configure to generate the clock control signal and the plurality of threshold voltages according to a target value and an output of the sampling circuit. The control circuit operates to control a ratio of a magnitude of a main cursor of the input signal and a magnitude of a pre-cursor intersymbol interference to be the target value.

10 Claims, 6 Drawing Sheets

(56) References Cited

OTHER PUBLICATIONS

Y. Moon et al., "A 2.41-pJ/bit 5.4-Gb/s Dual-Loop Reference-Less CDR With Fully Digital Quarter-Rate Linear Phase Detector for Embedded DisplayPort," IEEE TCAS I, vol. 66, No. 8, pp. 2907-2920, Aug. 2019.
G. Mandal, et al., "A 2.68mW/Gbps, 1.62-8.1Gb/s Receiver for Embedded DisplayPort Version 1.4b to Support 14dB Channel Loss," A-SSCC, 2020, pp. 1-4.
P. S. Sahni et al., "An Equalizer With Controllable Transfer Function for 6-Gb/s HDMI and 5.4-Gb/s DisplayPort Receivers in 28-nm UTBB-FDSOI," T-VLSI, vol. 24, No. 8, pp. 2803-2807, Aug. 2016.
"HDMI Specifications and programs", Available: https://www.hdmi.org/spec/index, 2019.
"PCI-SIG Specifications", Available: https://pcisig.com/specifications, 2019.
"DisplayPort Technical Overview", Available: http://www.vesa.org/wp-content/uploads/2011/01/ICCE-Presentation-on-VESA-DisplayPort.pdf., Jan. 10, 2011.
J. Bulzacchelli et al., "A 28Gb/s 4-tap FFE/15-tap DFE serial link transceiver in 32nm SOI CMOS technology," ISSCC, 2012, pp. 324-326.
G. Balamurugan et al., "A scalable 5-15 Gbps, 14-75 mW low-power I/O transceiver in 65 nm CMOS," JSSC, vol. 43, No. 4, pp. 1010-1019, Apr. 2008.
J. Im et al., "A 40-to-56 Gb/s PAM-4 Receiver With Ten-Tap Direct DecisionFeedback Equalization in 16-nm FinFET," JSSC, vol. 52, No. 12, pp. 3486-3502, Dec. 2017.
T. Norimatsu et al., "A 25Gb/s Multistandard Serial Link Transceiver for 50dBLoss Copper Cable in 28nm CMOS," ISSCC, 2016, pp. 66-68.
J. Lee et al., "A 2.44-pJ/b 1.62-10-Gb/s Receiver for Next Generation Video Interface Equalizing 23-dB Loss With Adaptive 2-Tap Data DFE and 1-Tap Edge DFE," TCAS II, vol. 65, No. 10, pp. 1295-1299, Oct. 2018.
J. Lee et al., "A 0.1pJ/b/dB 1.62-to-10.8Gb/s Video Interface Receiver with Fully Adaptive Equalization Using Un-Even Data Level," VLSI, 2019, pp. C198-C199.
S. Saxena et al., "A 2.8mW/Gb/s 14Gb/s serial link transceiver in 65nm CMOS," VLSI, 2015, pp. C352-C353.
R. K. Nandwana et al., "A 3-to-10Gb/s 5.75pJ/b transceiver with flexible clocking in 65nm CMOS," ISSCC, 2017, pp. 492-493.
S. Son et al., "A 2× Blind Oversampling FSE Receiver with Combined Adaptive Equalization and Infinite-Range Timing Recovery," ASSCC, 2018, pp. 201-204.
M. Park et al., "A 7Gb/s 9.3mW 2-Tap Current-Integrating DFE Receiver," ISSCC, 2007, pp. 230-599.
T. Toi et al., "A 25.6Gb/s Uplink-Downlink Interface Employing PAM-4-Based 4-Channel Multiplexing and Cascaded CDR Circuits in Ring Topology for High-Bandwidth and Large-Capacity Storage Systems," ISSCC, 2019, pp. 478-480.
A. Roshan-Zamir et al., "A 56-Gb/s PAM4 Receiver With Low-Overhead Techniques for Threshold and Edge-Based DFE FIR- and IIR-Tap Adaptation in 65-nm CMOS," JSSC, vol. 54, No. 3, pp. 672-684, Mar. 2019.
D. Pfaff et al., "A 56Gb/s Long Reach Fully Adaptive Wireline PAM-4 Transceiver in 7nm FinFET," VLSI, 2019, pp. C270-C271.
B. Yoo et al., "A 56Gb/s 7.7mW/Gb/s PAM-4 Wireline Transceiver in 10nm FinFET Using MM-CDR-Based ADC Timing Skew Control and LowPower DSP with Approximate Multiplier," ISSCC, 2020, pp. 122-124.
F. Spagna et al., "A 78mW 11.8Gb/s serial link transceiver with adaptive RX equalization and baud-rate CDR in 32nm CMOS," ISSCC, 2010, pp. 366-367.
K. Park et al., "A 6.4-to-32Gb/s 0.96pJ/b Referenceless CDR Employing ML-Inspired Stochastic Phase-Frequency Detection Technique in 40nm CMOS," ISSCC, 2020, pp. 124-126.
W. Rahman et al., "A 22.5-to-32-Gb/s 3.2-pJ/b Referenceless Baud-Rate Digital CDR With DFE and CTLE in 28-nm CMOS," JSSC, vol. 52, No. 12, pp. 3517-3531, Dec. 2017.
N. Qi et al., "A 51Gb/s, 320mW, PAM4 CDR with baud-rate sampling for high-speed optical interconnects," ASSCC, 2017, pp. 89-92.
Y. Lee et al., "A 25-Gb/s, 2.1-pJ/bit, Fully Integrated Optical Receiver With a Baud-Rate Clock and Data Recovery," JSSC, vol. 54, No. 8, pp. 2243-2254, Aug. 2019.
M.-C. Choi et al., "A 0.1-pJ/b/dB 28-Gb/s Maximum-Eye Tracking, WeightAdjusting MM CDR and Adaptive DFE with Single Shared Error Sampler," VLSI, 2020, pp. 1-2.
S. Ibrahim et al., "Low-Power CMOS Equalizer Design for 20-Gb/s Systems," JSSC, vol. 46, No. 6, pp. 1321-1336, 2011.
V. Stojanovic et al., "Autonomous dual-mode (PAM2/4) serial link transceiver with adaptive equalization and data recovery," JSSC, vol. 40, No. 4, pp. 1012-1026, Apr. 2005.
K. Mueller et al., "Timing Recovery in Digital Synchronous Data Receivers," Transactions on Communications, vol. COM-24, No. 5, pp. 516-531, May 1976.
K. Zheng et al., "An Inverter-Based Analog Front End for a 56 GB/S PAM4 Wireline Transceiver in 16NMCMOS," VLSI, 2018, pp. 269-270.
R. Dokania et al., "A 5.9pJ/b 10Gb/s serial link with unequalized MMCDR in 14nm tri-gate CMOS," ISSCC, 2015, pp. 1-3.
J. Han et al., "Design Techniques for a 60 Gb/s 173 mW Wireline Receiver Front-end in 65 nm CMOS Technology," JSSC, vol. 51, No. 4, pp. 871-880, Apr. 2016.
H. Joo et al., "A Maximum-Eye-Tracking CDR with Biased Data-Level and Eye Slope Detector for Optimal Timing Adaptation," IEEE A-SSCC, Nov. 2019, 243-244.
B. Razavi, "Design of integrated circuits for optical communication", McGrawHill Professional, 2003.

* cited by examiner

RECEIVER FOR REMOVING INTERSYMBOL INTERFERENCE

CROSS-REFERENCE TO RELATED APPLICATION

The present application claims priority under 35 U.S.C. § 119(a) to Korean Patent Application No. 10-2021-0189853, filed on Dec. 28, 2021, which is incorporated herein by reference in its entirety.

BACKGROUND

1. Technical Field

Various embodiments generally relate to a receiver that removes intersymbol interference.

2. Related Art

When a symbol is transmitted, a symbol to be transmitted affects a symbol in another position due to noise or frequency characteristics.

A main cursor corresponds to a magnitude of a symbol that is actually received at a receiver corresponding to a symbol transmitted from a transmitter. A pre-cursor intersymbol interference (ISI) corresponds to interference that affects a preceding symbol in time, and a post-cursor ISI corresponds to interference that affects a later symbol in time.

To increase bandwidth, a receiver supporting a multilevel signal such as a four-level Pulse Amplitude Modulated (PAM-4) signal may be used.

However, since amplitude differences between values of a main cursor becomes smaller in the multilevel signal (relative to a signal having fewer levels), the multi-level symbol may be more affected by ISI. In particular, it is difficult to remove pre-cursor ISI in a receiver.

In order to reduce bit error rate (BER), a phase detector (PD) should be able to manage pre-cursor ISI.

A conventional clock data recovery circuit (CDR) reduces power consumption by using a Baud-Rate phase detector (BRPD) instead of an oversampling method. The BRPD samples the incoming signal to perform clock recovery no more than once per an estimated Unit Interval (UI) of the incoming signal, whereas an oversampling method may sample the incoming signal two or more times per UI.

A Mueller-Muller phase detector (MMPD) is a type of a BRPD.

An MMPD has a characteristic of making a magnitude of a first post-cursor zero by using an adaptive decision feedback equalizer (DFE) and locking a phase of a sampling clock at the point where a magnitude of a first pre-cursor ISI becomes equal to a magnitude of a first post-cursor ISI. However, a clock data recovery circuit using an MMPD is vulnerable to noise, and a problem may occur in which a locking point drifts.

For this reason, a phase detection technique for adding offset to a first pre-cursor ISI has been proposed, but even if an adaptive equalizer is used, vertical eye margin (VEM) cannot be guaranteed when the proposed technique is used to receive a multilevel signal.

SUMMARY

In accordance with an embodiment of the present disclosure, a receiver may include a sampling circuit configured to sample a plurality of comparison results between a respective plurality of threshold voltages and an input signal according to a sampling clock signal; a clock controller configured to generate the sampling clock signal according to a clock control signal; and a control circuit configure to generate the clock control signal and the plurality of threshold voltages according to a target value and an output of the sampling circuit wherein a ratio of a magnitude of a main cursor of the input signal and a magnitude of a pre-cursor intersymbol interference is controlled to be the target value.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and explain various principles and advantages of those embodiments.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of teachings of the present disclosure. The detailed description is not meant to limit this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s).

Figure 1:
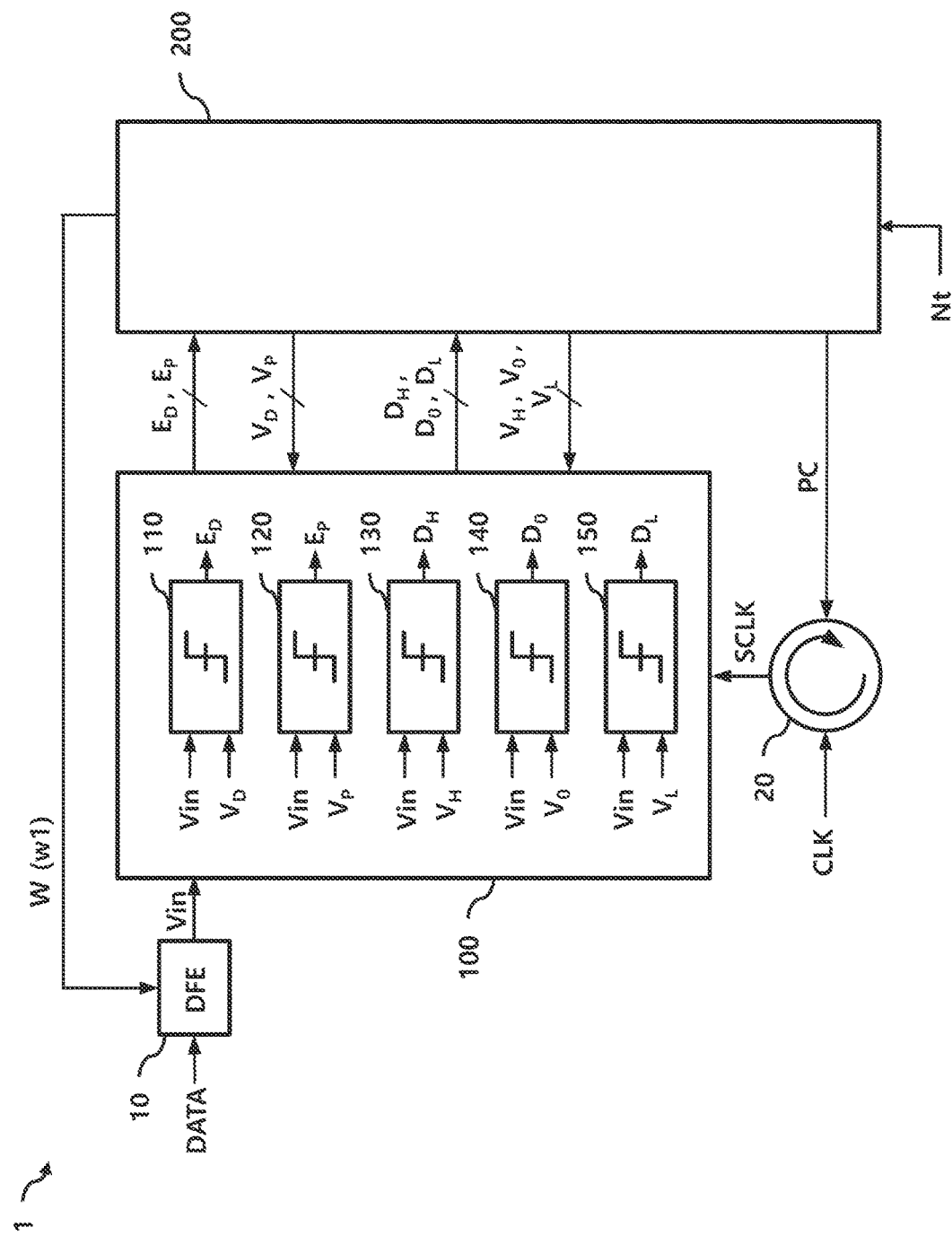
FIG. 1 illustrates a receiver according to an embodiment of the present disclosure.

FIG. 1 is a block diagram showing a receiver 1 according to an embodiment of the present disclosure.

The receiver 1 includes an equalizer 10, a clock controller 20, a sampling circuit 100, and a control circuit 200.

In the present embodiment, the equalizer 10 is a decision feedback equalizer (DFE) and equalizes a data signal DATA according to the equalization control signal W to produce an input signal Vin.

In this embodiment, the equalization control signal W is a coefficient multiplied by an output of a first post-tap. That is, the equalizer 10 subtracts a value obtained by multiplying the output of the first post-tap by the equalization control signal W from the data signal DATA to output the input signal Vin.

Since configuration and an operation of a DFE are well known, a detailed description of the equalizer 10 will be omitted.

In embodiments, the data signal DATA may be a differential signal, and the equalizer 10 may generate two output signals having opposite phases. In such an embodiment, the input signal Vin corresponds to a signal obtained by subtracting one of the two output signals from the other, and therefore the input signal Vin may have both negative and positive values.

The clock controller 20 generates a sampling clock signal SCLK by controlling a phase of the clock signal CLK according to a phase control signal PC. Since configuration and operation of circuits for controlling a phase of a clock signal are well known, a detailed description of the clock controller 20 will be omitted The sampling circuit 100 includes a plurality of samplers 110 to 150 that perform respective sampling operations on a difference between the input signal Vin and respective threshold voltages according to the sampling clock signal SCLK. The sampling circuit 100 shown in FIG. 1 corresponds to a sampling circuit for use with a PAM-4 input signal Vin, but embodiments are not limited thereto.

The first sampler 110 samples a difference between the input signal Vin and a data level threshold voltage $V_D$ according to the sampling clock signal SCLK to generate a data level signal $E_D$.

The data level threshold voltage $V_D$ is determined by the control circuit 200 and will be described in detail below.

The second sampler 120 samples a difference between the input signal Vin and a phase comparison threshold voltage $V_P$ according to the sampling clock signal SCLK to generate a phase difference signal $E_P$.

The phase comparison threshold voltage $V_P$ is a signal determined by the data level threshold voltage $V_D$ and a target value $N_r$.

The phase comparison threshold voltage $V_P$ is determined by the control circuit 200 and will be described in detail below.

The third sampler 130 generates a first data signal $D_H$ by sampling a difference between the input signal Vin and a first data threshold voltage $V_H$ according to the sampling clock signal SCLK.

The first data threshold voltage $V_H$ is a signal determined by the data level threshold voltage $V_D$ and the target value $N_r$.

The first data threshold voltage $V_H$ is determined by the control circuit 200 and will be described in detail below.

The fourth sampler 140 samples a difference between the input signal Vin and a second data threshold voltage Vo according to the sampling clock signal SCLK to generate a second data signal $D_O$. In embodiments, the second data threshold voltage $V_O$ corresponds to 0V.

The fifth sampler 150 samples a difference between the input signal Vin and a third data threshold voltage $V_L$ according to the sampling clock signal SCLK to generate the third data signal $D_L$.

In the present embodiment, the third data threshold voltage $V_L$ corresponds to a value having a magnitude equal to that of the first data threshold voltage $V_H$ and having opposite sign to that of the first data threshold voltage $V_H$.

The control circuit 200 generates a plurality of threshold voltages used in the sampling circuit 100 using the signals output from the sampling circuit 100.

The third sampler 130, the fourth sampler 140, and the fifth sampler 150 determine a data level of the input signal Vin and may be collectively referred to as a data level sampler. The three samplers that comprise the data level sampler portion of the sampling circuit 100 corresponds to a PAM-4 input signal Vin, but embodiments are not limited thereto, and in other embodiments wherein the PAM-4 input signal Vin uses a different modulation, the data level sampler portion may include either less samplers or more samplers.

The control circuit 200 generates the phase control signal PC and the equalization control signal W using one or more of the signals output from the sampling circuit 100.

Figure 2B:
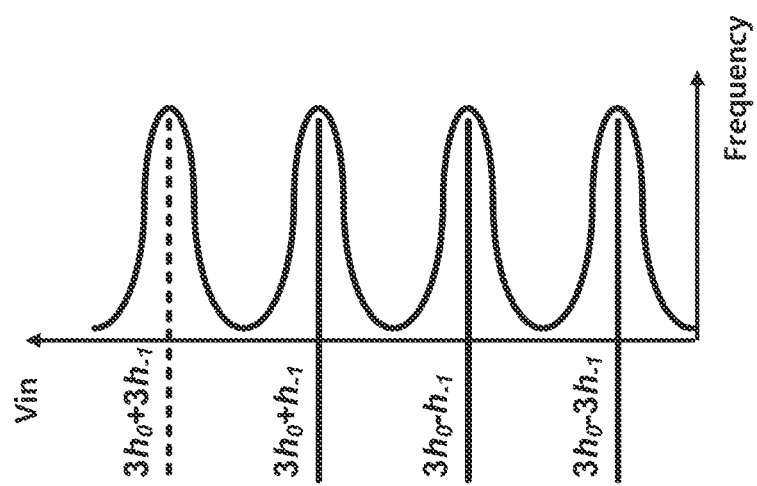
FIGS. 2A and 2B illustrate an eye diagram of an input signal according to an embodiment of the present disclosure.
Figure 2A:
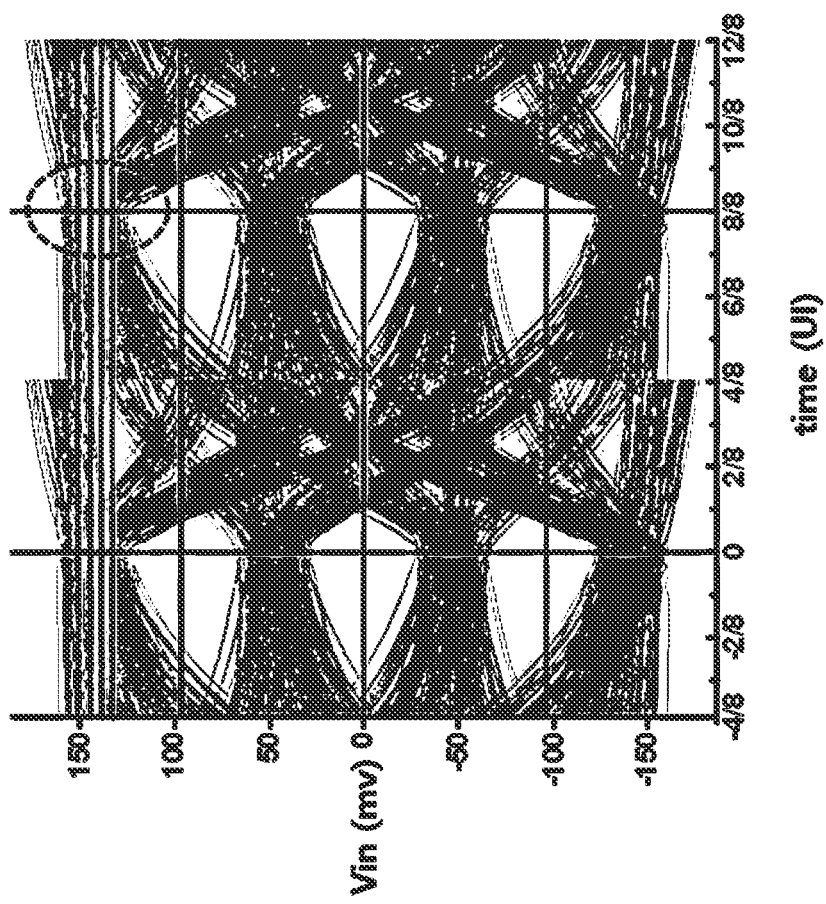

FIGS. 2A and 2B illustrate an eye diagram and a portion thereof, respectively, of an input signal Vin from which a post-cursor ISI has been removed.

As described above, a post-cursor ISI can be removed through a conventional technique. The present disclosure provides techniques for removing a pre-cursor ISI.

In this embodiment, only a pre-cursor ISI caused by a symbol preceding by the main cursor by one unit interval (UI) is considered. A UI corresponds to the inverse of the symbol rate (or baud rate) of the data signal DATA.

In this embodiment, the input signal Vin is a PAM-4 signal. Accordingly, the input signal Vin may have one of four levels "00", "01", "10", and "11". In this embodiment, these data are indicated with symbols −3, −1, +1, and +3, respectively.

FIG. 2A is an eye diagram for 2 unit intervals (UIs) and FIG. 2B illustrates a frequency of occurrence of values in the part indicated by a dotted line in FIG. 2A.

In FIG. 2A, when the time 0 is viewed as the present time and the time 1 is viewed as future time, a data at time 0 corresponds to a current data, and a data at time 1 (shown as 8/8 in FIG. 2A) corresponds to a future data.

In FIG. 2A, the vertical axis indicates a signal level of the input signal Vin, which corresponds in embodiments to a difference between two differential output signals provided from the equalizer 10 as described above.

In FIG. 2A, a data in the area indicated by the dotted line corresponds to a data having a data level "11", that is, a symbol +3. Since a pre-cursor symbol corresponds to one of 4 symbol values, the input signal Vin has the distribution of values such as shown in FIG. 2B when it is enlarged.

In FIG. 2B, the vertical axis corresponds to a magnitude of the input signal Vin, and the horizontal axis corresponds to a frequency of occurrence of that magnitude.

Also, in FIG. 2B, ho indicates magnitude of a main cursor, $h_{-1}$ indicates magnitude of a pre-cursor ISI, and a coefficient in front of ho or $h_{-1}$ indicates a symbol of a corresponding data. In the following disclosure, a main cursor symbol represents a symbol corresponding to a main cursor (in the example of FIG. 2B, the symbol corresponding to time 1 in FIG. 2A) and a pre-cursor symbol (in the example of FIG. 2B, the symbol corresponding to time 0 in FIG. 2A) represents a symbol causing a pre-cursor ISI.

That is, $3h_0+3h_{-1}$ is a reference value corresponding to the input signal Vin in which a main cursor symbol is 3 and a pre-cursor symbol is 3, $3h_0+h_{-1}$ is a reference value corresponding to the input signal Vin in which a main cursor symbol is 3 and a pre-cursor symbol is 1, and $3h_0-h_{-1}$ is a reference value corresponding to the input signal in which a main cursor symbol is 3 and a pre-cursor symbol is −1, and $3h_0-3h_{-1}$ is a reference value corresponding to the input signal in which a main cursor symbol is 3 and a pre-cursor symbol is −3.

As shown in FIG. 2B, a frequency distribution has a greatest value when the input signal Vin corresponds to one of the reference values and decreases as the input signal Vin is further away from a reference value.

As shown in FIG. 2B, it can be seen that a signal is distributed over a certain range by the influence of the ISI from a pre-cursor symbol. While FIG. 2B shows the case where the main cursor symbol corresponds to +3, this also occurs when the main cursor symbol corresponds to 1, −1, or −3. This influence of the pre-cursor symbol reduces the size of eyes such as the eyes shown in FIG. 2A.

In order to remove the pre-cursor ISI as described above, the control circuit 200 controls a ratio of the main cursor to the pre-cursor ISI to be a target value $N_t$. In this case, the target value $N_t$ may be provided to the control circuit 200 as a predetermined value.

When magnitude of a main cursor is expressed as $h_0$ and magnitude of a pre-cursor ISI is expressed as $h_{-1}$, the control circuit 200 performs a control operation so that the relationship of Equation 1 is established.

$$N_t = \frac{h_0}{h_{-1}} \quad [\text{Equation 1}]$$

In this case, the target value $N_t$ may be adjusted through simulation or experiment to secure a sufficient eye.

Figure 3:
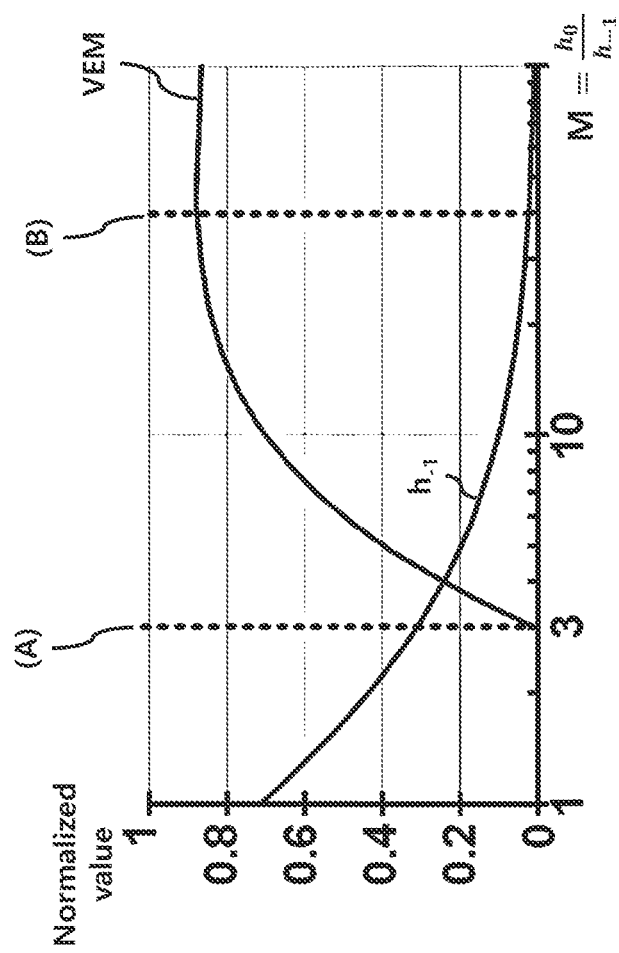
FIG. 3 illustrates conditions related to setting a target value according to an embodiment of the present disclosure.

FIG. 3 shows a normalized value of vertical eye margin (VEM) of a PAM-4 signal and a magnitude of a pre-cursor symbol $h_1$ with respect to a ratio M of a main cursor symbol and a pre-cursor symbol.

In FIG. 3, the line (A) indicates where the VEM becomes 0, and it can be seen that if M is less than or equal to 3, the eye is closed. Accordingly, the target value $N_t$ should be set to be greater than 3.

In an experiment for a PAM-8 signal, it was found that eye is closed when M was less than or equal to 7.

In FIG. 3, the line (B) corresponds to a case when M is 40 and indicates where an operation of the receiver 1 becomes unstable. The unstable operation of the receiver 1 means that the phase of the sampling clock signal SCLK does not converge uniformly in the embodiment shown in FIG. 1.

Accordingly, the target value $N_t$ should be less than 40.

The numerical values described in the graph of FIG. 3 may vary according to, for example, channel characteristics, an environment in which the receiver 1 operates, and the like. In the graph of FIG. 3, setting the target value $N_t$ as a point for stabilizing the operation of the receiver while sufficiently increasing the VEM value can be viewed as a design choice by a person skilled in the art, and detailed description thereof will be omitted.

Figure 4:
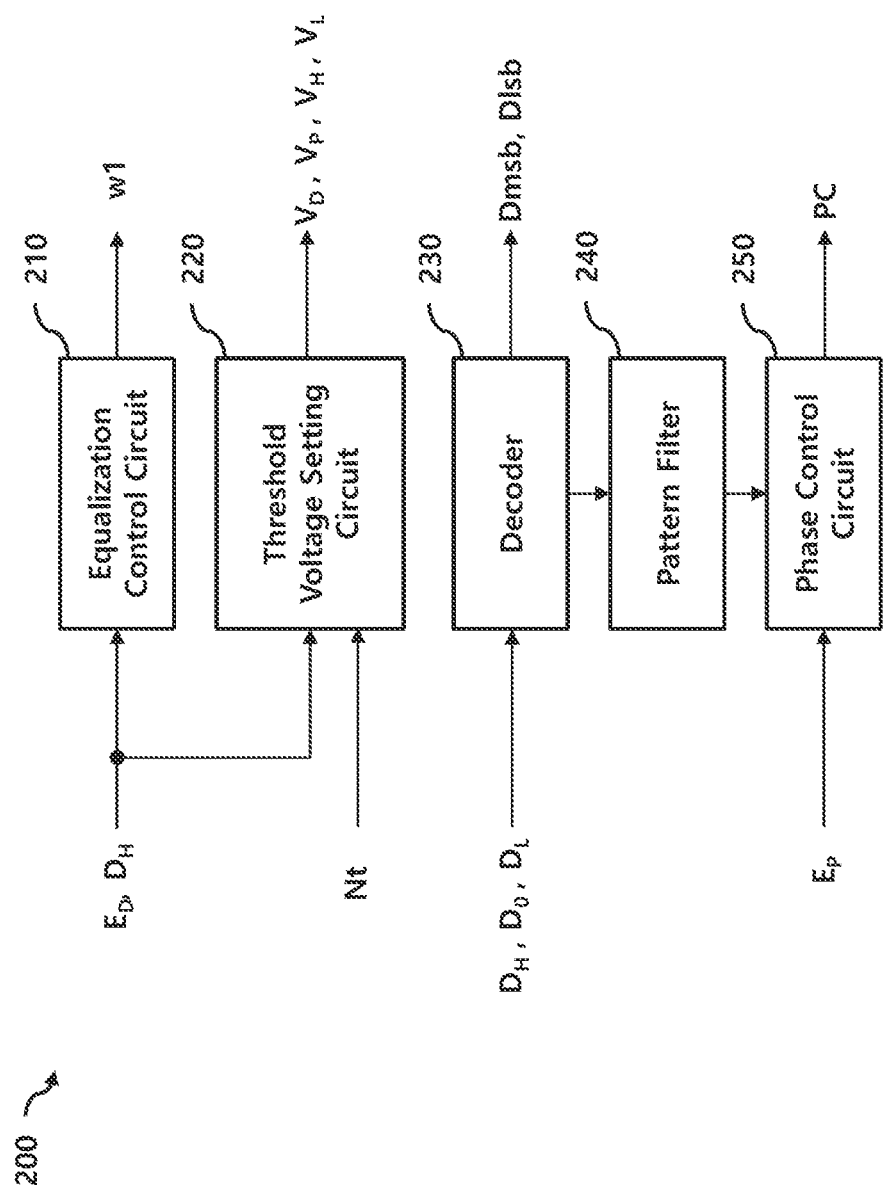
FIG. 4 illustrates a control circuit according to an embodiment of the present disclosure.

FIG. 4 is a detailed block diagram illustrating the control circuit 200.

The control circuit 200 includes an equalization control circuit 210, a threshold voltage setting circuit 220, a decoder 230, a pattern filter 240, and a phase control circuit 250.

The equalization control circuit 210 performs an operation of determining magnitude of a post-cursor ISI to be removed by the equalizer 10.

In this embodiment, the equalization control circuit 10 receives the data level signal $E_D$ from the first sampler 110 and the first data signal $D_H$ from the third sampler 130, and performs an operation according to a Sign-Sign Least-Mean-Square (SS-LMS) algorithm. The equalization control signal w1 is set so that the equalizer 10 can output the input signal Vin by removing the first post-cursor ISI h1.

Since the configuration and operation of the equalization control circuit 210 operating according to the SSLMS algorithm are well known in the prior art together with the equalizer 10 (such as in articles like, for example, ˹Jinhyung Lee, "Design of High-Speed Receiver for Video Interface with Adaptive Equalization", Ph.D. Dissertation, Seoul National University, 2019. ˼), a detailed description thereof will be omitted.

The threshold voltage setting circuit 220 determines the data level threshold voltage $V_D$.

In this embodiment, as shown in FIG. 2B, signal levels are distributed around four reference values due to pre-cursor ISI for a main cursor.

The threshold voltage setting circuit 220 may determine the data level threshold voltage $V_D$ as one of four reference values for a main cursor symbol having a value of 3.

For example, with reference to the first data signal $D_H$ output from the third sampler 130, the data level threshold voltage $V_D$ may be set as one of the four reference values as shown in FIG. 2B by using a frequency when the data level signal $E_d$ is positive and a frequency when the data level signal $E_d$ is negative.

The threshold voltage setting circuit 220 may determine a new value for the data level threshold voltage $V_D$ according to Equation 2 using the SS-LMS algorithm, wherein $V_D[X]$ is a value of the data level threshold voltage $V_D$ at a time x.

$$V_D[n+1]=V_D[n]+\mu_{up}\times k_D, \text{ if } E_D=1$$

$$V_D[n+1]=V_D[n]-\mu_{up}\times k_D, \text{ if } E_D=0 \quad [\text{Equation 2}]$$

In Equation 2, the input signal Vin being greater than the data level threshold voltage $V_D$ causes the data level signal $E_D$ to be 1, and the input signal Vin being less than the data level threshold voltage $V_D$ causes the data level signal $E_D$ to be 0. In Equation 2, $k_D$ corresponds to a predetermined voltage adjustment range.

When the SS-LMS algorithm as according to a relation in Equation 2, the data level threshold voltage $V_D$ can be generated using the two coefficients $\mu_{up}$ and $\mu_{dn}$ as shown in the following table.

TABLE 1

| $\mu_{up}$ | $\mu_{dn}$ | $V_D$ |
|---|---|---|
| 7 | 1 | $3h_0 + 3h_{-1}$ |
| 5 | 3 | $3h_0 + h_{-1}$ |
| 3 | 5 | $3h_0 - h_{-1}$ |
| 1 | 7 | $3h_0 - 3h_{-1}$ |

In Table 1, $\mu_{up}$ corresponds to an expected steady-state frequency of occurrence of the data level signal $E_D$ being 0 for each data level threshold voltage $V_D$, and pan corresponds to an expected steady-state frequency of occurrence of the data level signal $E_D$ being 1 for each data level threshold voltage $V_D$. For example, if the data level threshold voltage $V_D$ is set to $3h_0+3h_{-1}$, in the steady-state, data level signal $E_D$ can be expected to be 0 for seven times as often as it is 1. Therefore to balance contribution of the two states, pup is set to be seven times higher than pan, so that the rarer occurrences of $E_D$ being 1 can balance the more common case of more common occurrences of $E_D$ being 0. On the other hand, when the data level threshold voltage $V_D$ is set to, for example, the lower value is of $3h_0+h_{-1}$, the respective frequencies of occurrence of $E_D=0$ and $E_D=1$ are closer, and accordingly the values given to $\mu_{up}$ and $\mu_{dn}$ are closer.

In this embodiment, the data level threshold voltage $V_D$ is set to $3h_0+3h_{-1}$. The data level threshold voltage $V_D$ may correspond to a maximum expected value of the input signal Vin such as may occur when the symbol corresponding to the main cursor has a maximum value (for example, +3 in PAM-4) and the post-cursor ISI also has a maximum expected value.

The threshold voltage setting circuit 220 sets the phase comparison threshold voltage $V_P$ using the data level threshold voltage $V_D$ and the target value $N_t$.

In this embodiment, the phase comparison threshold voltage $V_P$ has a value smaller than the data level threshold voltage $V_D$ and is set as in Equation 3.

$$V_P = V_D \times \left(\frac{3N_t - 3}{3N_t + 3}\right) \quad \text{[Equation 3]}$$

More generally, when the number of levels in the modulation scheme of the input signal Vin is M (for example, M=4 for PAM-4, M=8 for PAM-8, and so on), in an embodiment, the phase comparison threshold voltage $V_P$ may be set according to Equation 3B.

$$V_P = V_D \times \left(\frac{(M-1)N_t - (M-1)}{(M-1)N_t + (M-1)}\right) \quad \text{[Equation 3B]}$$

The threshold voltage setting circuit 220 sets the first data threshold voltage $V_H$ using the data level threshold voltage $V_D$ and the target value $N_t$.

In the present embodiment, the first data threshold voltage $V_H$ is set as in Equation 4.

$$V_H = V_D \times \left(\frac{2N_t}{3N_t + 3}\right) \quad \text{[Equation 4]}$$

More generally, when the number of levels in the modulation scheme of the input signal Vin is M, in an embodiment, the phase comparison threshold voltage $V_P$ may be set according to Equation 4B.

$$V_H = V_D \times \left(\frac{(M-2)N_t}{(M-1)N_t + (M-1)}\right) \quad \text{[Equation 4B]}$$

The first data threshold voltage $V_H$ of Equation 4 corresponds to $2h_0$ at the locking point.

The threshold voltage setting circuit 220 also sets the second data threshold voltage $V_O$ and the third data threshold voltage $V_L$.

As described above, the second data threshold voltage $V_O$ has a value of 0, and the third data threshold voltage $V_L$ has the same magnitude as the first data threshold voltage $V_H$ but has an opposite sign.

The decoder 230 determines which symbol the received data corresponds to by using the first data $D_H$, the second data $D_O$, and the third data $D_L$, and outputs 2-bit signals $D_{msb}$ and $D_{lsb}$.

For example, if all of the first data $D_H$, the second data $D_O$, and the third data $D_L$ are at a high level, it is determined that the received data corresponds to symbol +3, and "11" is set as the 2-bit signal $D_{msb}$ and $D_{lsb}$.

The pattern filter 240 determines whether data received from the decoder 230 meets a predetermined condition.

In this case, the predetermined condition is related to whether a phase comparison operation is performed in the second sampler 120. The phase comparison operation may be performed when the main cursor symbol corresponds to a value used to set the data level threshold voltage $V_D$ and the pre-cursor symbol has a value different from the main cursor symbol, so that a phase transition has occurred between the pre-cursor symbol and the main cursor symbol.

As described above, in the present embodiment, the data level threshold voltage $V_D$ corresponds to a reference value when the main cursor symbol is 3 and the pre-cursor symbol is 3 among the four reference values.

To this end, the pattern filter 240, using the data output from the decoder 230, determines whether the main cursor symbol is 3 and the pre-cursor symbol is −3. In this embodiment, the condition used in the determination by the pattern filter 240 correspond to a phase transition having a largest possible difference in magnitude between the main cursor symbol and the pre-cursor symbol, so that a slope of the transition from the pre-cursor symbol to the main cursor symbol is maximized to improve the phase detection.

The phase control circuit 250 determines a case in which the phase comparison signal $E_P$ is "1" as an "Early" state and a case in which the phase comparison signal $E_P$ is "0" as a "Late" state, and determines the phase control signal PC according to the determination.

Figures 5A, 5B:
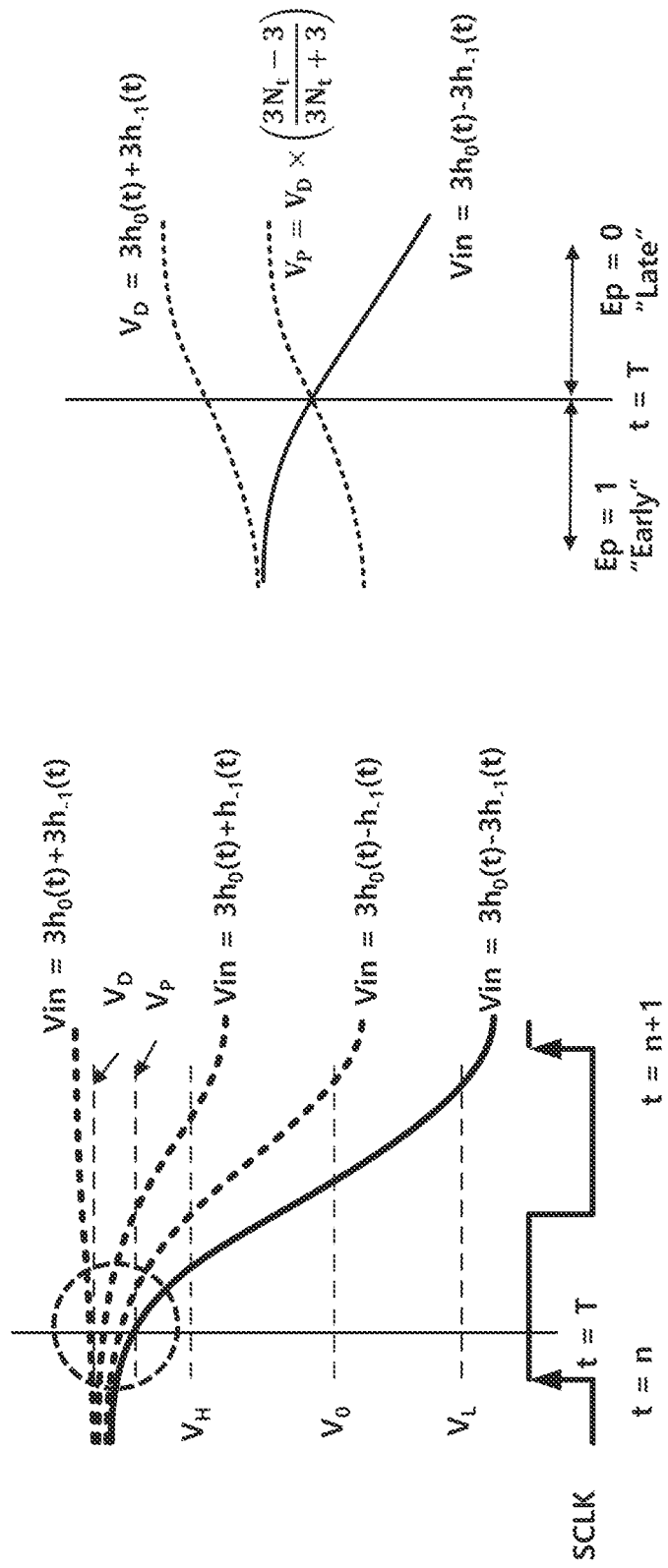
FIGS. 5A and 5B illustrate an operation of a phase control circuit according to another embodiment of the present disclosure.

FIGS. 5A and 5B are diagrams showing an operation of the phase control circuit 250.

FIG. 5A is a graph showing an input signal Vin, a plurality of threshold voltages such as $V_D$, $V_P$, $V_H$, $V_O$, and $V_L$, and a sampling clock signal SCLK together.

As described above with reference to FIGS. 2A and 2B, in the illustrated embodiment, for each possible value of the main cursor symbol, the input signal Vin may have four reference values according to possible values of a pre-cursor symbol. In FIGS. 5A and 5B, a case where the main cursor symbol is 3 and a pre-cursor symbol −3 is indicated by a solid line, and the rest of the cases for the other possible values of the pre-cursor symbol are indicated by dotted lines.

In the discussion that follows, it is assumed that the input signal Vin corresponds to a signal when a main cursor is +3 and a pre-cursor is −3.

In this embodiment, the phase comparison threshold voltage $V_P$, the first data threshold voltage $V_H$, and the third data threshold voltage $V_L$ are determined according to the data level threshold voltage $V_D$. Because the data level threshold voltage $V_D$ changes with time, the first data threshold voltage $V_H$ and the third data threshold voltage $V_L$ also change with time.

In FIG. 5A, the data level threshold voltage $V_D$, the phase comparison threshold voltage $V_P$, the first data threshold voltage $V_H$, and the third data threshold voltage $V_L$ are displayed as dashed lines extending respective values at t equals n.

FIG. 5B is an enlarged view of a portion of FIG. 5A indicated by a dotted circle.

At the point where t is T, the input signal Vin and the phase comparison threshold voltage $V_P$ cross.

The phase comparison signal $E_P$ has a value of "1" when t is less than T and a value of "0" when t is greater than T. That is, the section where t<T corresponds to the "Early" state, and the section where t>T corresponds to the "Late" state.

The phase control circuit 250 generates the phase control signal PC according to the determined "Early" or "Late" states and adjusts phase of the sampling clock signal SCLK accordingly.

For example, when the "Early" state is determined, the phase of the sampling clock signal SCLK is delayed, and when the "Late" state is determined, the phase control signal PC is generated to advance the phase of the sampling clock signal SCLK.

Figure 6:
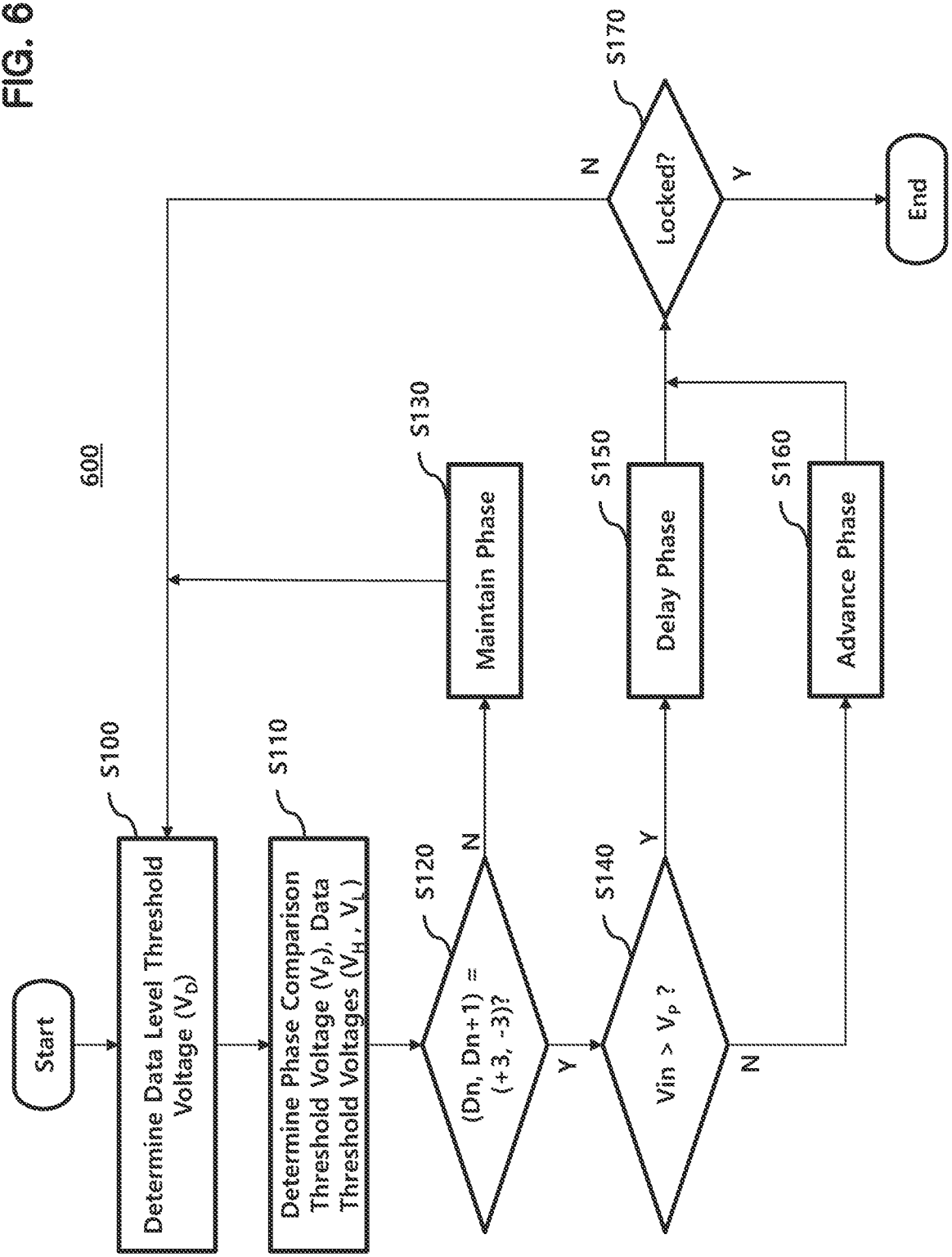
FIG. 6 is a flowchart illustrating an operation of a control circuit according to an embodiment of the present disclosure.

FIG. 6 is a flowchart illustrating a process 600 for operation of the control circuit 200 according to a present disclosure.

The process 600 of FIG. 6 may be performed, for example, every operation period of the sampling clock signal SCLK.

First, the data level threshold voltage $V_D$ is determined at S100.

As described above, in the present embodiment, the data level threshold voltage $V_D$ is set to $3h_0+3h_{-1}$.

Thereafter, a phase comparison threshold voltage $V_P$ and data threshold voltages $V_H$ and $V_L$ are determined at S110.

In the present embodiment, the phase comparison threshold voltage $V_P$ is determined as shown in Equation 3 using the data level threshold voltage $V_D$ and the target value $N_t$, and the first data threshold voltage $V_H$ is decided according to Equation 4, the third data threshold voltage $V_L$ is determined by changing the sign of the first data threshold voltage $V_H$.

Thereafter, it is determined whether a main cursor symbol corresponds to +3 and a pre-cursor symbol corresponds to −3 at S120.

In response to a determination at S120 that it is not the case that the main cursor corresponds to +3 and the pre-cursor corresponds to −3, the phase of the sampling clock signal SCLK is maintained at S130. Then the process 600 returns to step S100.

In response to a determination at S120 that the main cursor symbol corresponds to +3 and the pre-cursor symbol corresponds to −3, the input signal Vin compares the input signal Vin to the phase comparison threshold voltage $V_P$ at S140.

In response to the comparison at S140 indicating that the input signal Vin is greater than the phase comparison threshold voltage $V_P$, a phase of the sampling clock signal SCLK is delayed at S150.

In response to the comparison indicating that the input signal Vin is not greater than the phase comparison threshold voltage $V_P$, the phase of the sampling clock signal SCLK is advanced at S160.

After the steps S150 and S160, the process 600 determines whether the locking condition is satisfied at S170.

For example, when the fluctuation range of the phase is less than or equal to a threshold value for more than a predetermined time, the process 600 may determine that the control circuit 200 is in a locking state that satisfies the locking condition.

If the control circuit 200 is not determined to be in the locking state, the process 600 returns to step S100, and if the control circuit 200 is determined to be in the locking state, the process 600 is terminated.

Although various embodiments have been illustrated and described, various changes and modifications may be made to the described embodiments without departing from the spirit and scope of the invention as defined by the following claims.

What is claimed is:

1. A receiver comprising:
    a sampling circuit configured to sample a plurality of comparison results between a respective plurality of threshold voltages and an input signal according to a sampling clock signal;
    a clock controller configured to generate the sampling clock signal according to a clock control signal; and
    a control circuit configured to generate the clock control signal and the plurality of threshold voltages according to a target value and an output of the sampling circuit wherein a ratio of a magnitude of a main cursor of the input signal and a magnitude of a pre-cursor intersymbol interference (ISI) is controlled to be the target value.

2. The receiver of claim 1, wherein the plurality of comparison results includes a data level signal, a phase comparison signal, and a plurality of data, and wherein the sampling circuit includes:
    a first sampler configured to generate the data level signal by sampling a difference between the input signal and a data level threshold voltage according to the sampling clock signal;
    a second sampler configured to generate the phase comparison signal by sampling a difference between the input signal and a phase comparison threshold voltage according to the sampling clock signal; and
    a data level sampler configured to generate the plurality of data by sampling a difference between the input signal and a plurality of data threshold voltages according to the sampling clock signal.

3. The receiver of claim 2, wherein the control circuit includes a threshold voltage setting circuit configured to determine the data level threshold voltage and the phase comparison threshold voltage,
    wherein the threshold voltage setting circuit determines the data level threshold voltage considering frequency of a value of the data level signal, and
    wherein the threshold voltage setting circuit determines the phase comparison threshold voltage according to the data level threshold voltage and the target value.

4. The receiver of claim 2, wherein the input signal is a Pulse Amplitude Modulation 4 (PAM-4) signal, and
    wherein the threshold voltage setting circuit further determines a first data threshold voltage, a second data threshold voltage, and a third data threshold voltage, which correspond to the plurality of data threshold voltages,
    wherein the data level sampler includes:
    a third sampling circuit configured to sample a difference between the input signal and the first data threshold voltage according to the sampling clock signal to generate a first data;
    a fourth sampling circuit configured to sample a difference between the input signal and the second data threshold voltage according to the sampling clock signal to generate a second data; and
    a fifth sampling circuit configured to sample a difference between the input signal and the third data threshold voltage according to the sampling clock signal to generate a third data.

5. The receiver of claim 4, wherein the control circuit further includes:
    a decoder configured to determine a symbol corresponding to the input signal according to the first data, the second data, and the third data;
    a pattern filter configured to determine whether an output of the decoder correspond to a predetermined symbol; and
    a phase control circuit configured to output a phase control signal according to an output of the pattern filter and the phase comparison signal.

6. The receiver of claim 5, wherein the input signal corresponds to a symbol among +3, +1, −1, and −3 according to a level of a data, wherein the threshold voltage setting circuit determines the data level threshold voltage so that the data level threshold voltage corresponds to a case where a main cursor symbol is +3 and a pre-cursor symbol is +3, and wherein the pattern filter determines whether the main cursor symbol is +3 and the pre-cursor symbol is −3.

7. The receiver of claim 6, wherein the threshold voltage setting circuit determines the data level threshold voltage by adjusting a ratio of cases where the data level signal is at a high level and cases where the data level signal is at a low level to become 7:1 .

8. The receiver of claim 5, wherein the phase control circuit generates the phase control signal so that a phase of the sampling clock signal is delayed when the phase comparison signal is at the high level and a phase of the sampling clock signal is advanced when the phase comparison signal is at the low level.

9. The receiver of claim 4, wherein the target value is between 3 and 40.

10. The receiver of claim 2, further comprising an equalizer configured to generate the input signal by equalizing a data signal according to an equalization control signal, wherein the control circuit generates the equalization control signal using the data level signal and one of the plurality of data and the equalizer generates the input signal by removing a post-cursor ISI at the data signal.

* * * * *